United States Patent
Schulz et al.

(10) Patent No.: US 7,619,418 B2
(45) Date of Patent: Nov. 17, 2009

(54) MAGNETIC FLOWMETER OUTPUT VERIFICATION

(75) Inventors: Robert K. Schulz, Excelsior, MN (US); Scot R. Foss, Eden Prairie, MN (US); William G. Totenhagen, Chanhassen, MN (US); Kirk A. Hunter, Robbinsdale, MN (US)

(73) Assignee: Rosemount Inc., Eden Prairie, MN (US)

( * ) Notice: Subject to any disclaimer, the term of this patent is extended or adjusted under 35 U.S.C. 154(b) by 102 days.

(21) Appl. No.: 11/788,392

(22) Filed: Apr. 19, 2007

(65) Prior Publication Data
US 2008/0258736 A1 Oct. 23, 2008

(51) Int. Cl.
*G01R 31/08* (2006.01)

(52) U.S. Cl. .................. 324/520; 73/861.01; 73/861.17

(58) Field of Classification Search ................ 324/520; 73/861.17
See application file for complete search history.

(56) References Cited

U.S. PATENT DOCUMENTS

| | | | |
|---|---|---|---|
| 4,723,449 A * | 2/1988 | Tiley ........................ | 73/861.17 |
| 5,086,806 A * | 2/1992 | Engler et al. ................ | 137/486 |
| 5,253,537 A * | 10/1993 | Tomita et al. ............ | 73/861.17 |
| 5,370,000 A * | 12/1994 | Herwig et al. ............ | 73/861.17 |
| 5,469,746 A | 11/1995 | Fukunaga et al. ......... | 73/861.12 |
| 5,530,639 A | 6/1996 | Schulz et al. ................ | 363/17 |
| 5,895,863 A * | 4/1999 | Glaudel et al. ............ | 73/861.01 |
| 6,920,799 B1 | 7/2005 | Schulz ..................... | 73/861.52 |
| 7,093,500 B2 | 8/2006 | Schulz et al. ............. | 73/861.15 |
| 2003/0005778 A1 * | 1/2003 | Budmiger ................ | 73/861.17 |

FOREIGN PATENT DOCUMENTS

WO WO 00/34744 6/2000
WO WO 2006/104712 10/2006

OTHER PUBLICATIONS

"Notification of Transmittal of the International Search Report and The Written Opinion of the International Searching Authority, or the Declaration" for PCT/US2008/004885 filed Apr. 16, 2008; 10 pages.

* cited by examiner

*Primary Examiner*—Timothy J Dole
*Assistant Examiner*—Benjamin M Baldridge
(74) *Attorney, Agent, or Firm*—Westman, Champlin & Kelly P.A.

(57) ABSTRACT

A magnetic flowmeter transmitter includes a flowtube and measurement circuitry which provides an output related to flow through the flowtube. Output circuitry, such as analog and pulse output circuitry, provides transmitter output(s) related to flow through the flowtube. Output verification circuitry of the transmitter is coupled to the output circuitry and provides verification of proper operation of the output circuitry by analyzing the output signals.

17 Claims, 8 Drawing Sheets

MAGNETIC FLOWMETER OUTPUT VERIFICATION

BACKGROUND

Magnetic flowmeters are used for liquid flow measurements in fluid processing installations such as chemical plants, food processing plants and pulp and paper plants. a magnetic flowmeter includes a flowtube assembly that is mounted in a piping system. The magnetic flowmeter also includes a transmitter that is connected to the flowtube assembly by a cable, or the transmitter can be integrally mounted to the flowtube assembly.

Like other microprocessor based or digital signal processor (DSP) based transmitters, magnetic flowmeters include measurement circuitry for measuring flow related parameters (flow rate, volume, etc.) of the fluid, and output circuitry for transmitting a flow related output to instrumentation and control equipment. Frequently, this transmission is over an analog circuit, such as a 4-20 mA current loop, which requires analog output circuitry. Also, it is common for flowmeters to transmit flow related information using pulse output circuitry to transmit pulses to a counter which counts the pulses to recover the flow related information.

Magnetic flowmeters are subject to failure due to extremes of temperature, vibration, chemical corrosion and the like. When a failure occurs, there is a need to rapidly diagnose the failure and replace a damaged part of the system. Ascertaining which portion of a magnetic flowmeter has failed can be difficult, particularly when the flowtube assembly is mounted in an inaccessible location. This difficulty in ascertaining whether various parts of a flowmeter are experiencing difficulty is particularly challenging when the analog or pulse outputs of the flowmeter are themselves being scrutinized. There is a desire to automate failure diagnosis so that service personnel can rapidly determine whether a transmitter needs replacement or whether the flowtube assembly and cabling need replacement.

The discussion above is merely provided for general background information and is not intended to be used as an aid in determining the scope of the claimed subject matter.

SUMMARY

A magnetic flowmeter transmitter includes a flowtube and measurement circuitry which provides an output related to flow through the flowtube. Output circuitry, such as analog and pulse output circuitry, provides transmitter output(s) related to flow through the flowtube. Output verification circuitry of the transmitter is coupled to the output circuitry and provides verification of proper operation of the output circuitry by analyzing the output signals.

Figure 9:
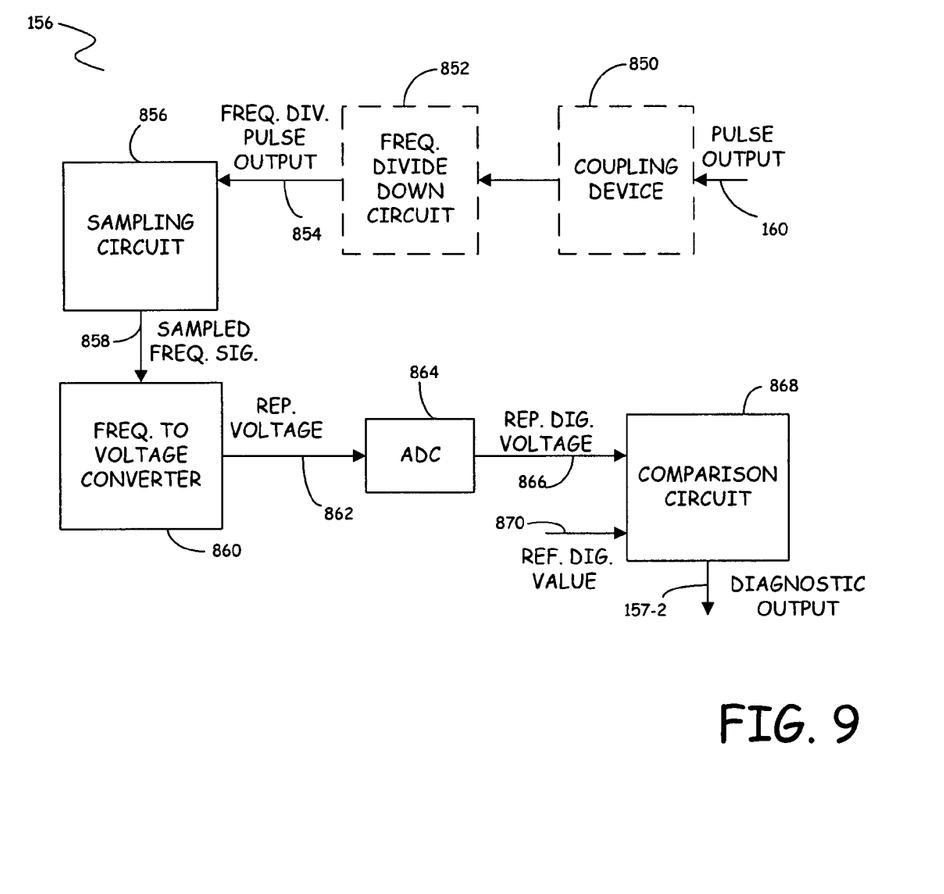
FIG. 9 is a diagrammatic view of portions of another embodiment of the output verification circuitry shown in FIG. 7.

FIG. 9 is a diagrammatic illustration showing features of output verification circuitry 156 in another example pulse output embodiment. As illustrated in FIG. 9, but as applicable to other illustrated embodiments as well, the pulse output can be connected to a digital input of the verification circuitry via a coupling device 850 such as an optocoupler or a transformer. This allows the pulse output to be analyzed without affecting the pulse output itself.

DETAILED DESCRIPTION

A magnetic flowmeter is disclosed that provides output circuitry verification or diagnostics. In particular, embodiments include output verification circuitry or functions to verify the analog or pulsed outputs of the magnetic flowmeter.

Figure 1:
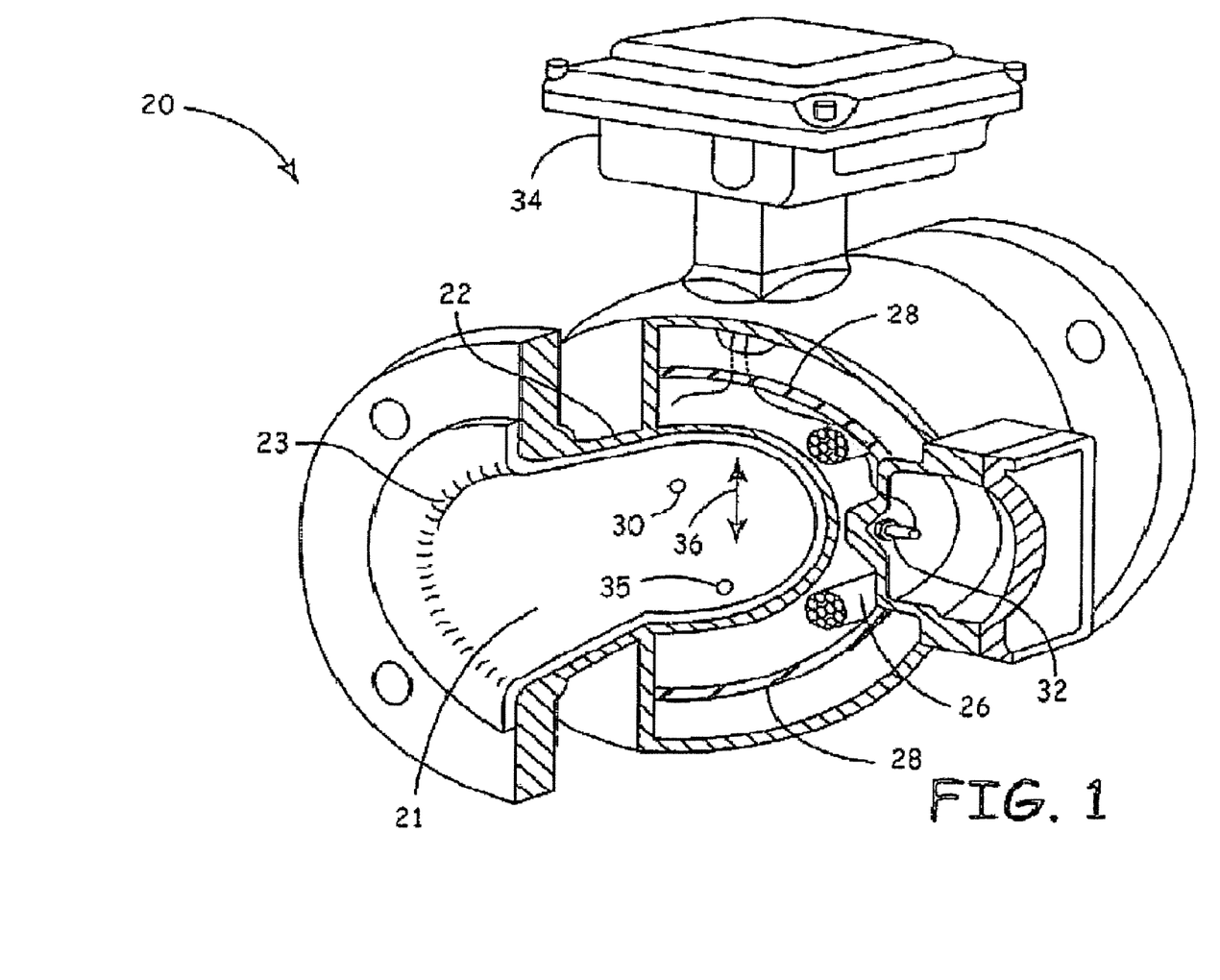
FIG. 1 is a partially cut away view of a magnetic flowmeter in which embodiments are particularly useful.

FIG. 1 is a partially cut away view of a magnetic flowmeter in which embodiments of the present invention are particularly useful. Magnetic flowmeter 20 includes a flowtube 22 formed of low magnetic permeability material with an electrically insulating liner 23, an electromagnet 26 is formed by a coil, a ferromagnetic core or shield 28 and electrodes 30, 32. The electromagnet 26 and the electrodes 30, 32 are wired to a transmitter circuit 34 as is ground electrode 35. In operation, the transmitter circuit drives the electromagnet 26 with an electrical current, and the electromagnet 26 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flowtube 22.

Figure 2:
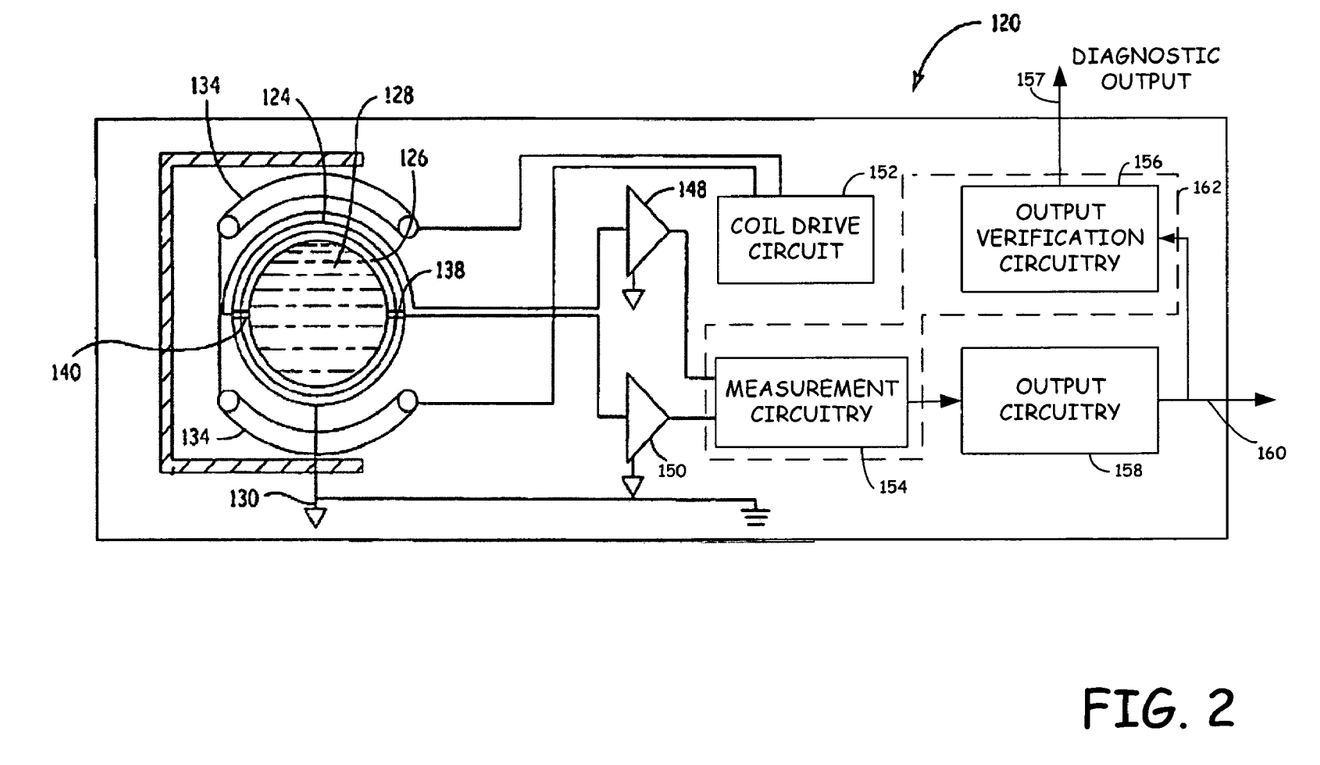
FIG. 2 is a diagrammatic view of a magnetic flowmeter in which embodiments are particularly useful.

FIG. 2 is a diagrammatic view of circuitry of a magnetic flowmeter transmitter in which embodiments of the present invention are particularly useful. The magnetic flowmeter 120 includes a flowtube 124 that has an insulated liner 126 adapted to carry a flowing liquid 128 that is electrically coupled to the flowtube 124 and is generally connected to earth ground 130. When the process piping is electrically coupled to the process fluid, an electrical connection between the piping and the flowtube provides the required electrical coupling of process fluid 128 to the flowtube. Coils 134 are positioned to apply a magnetic field to the process fluid in response to a drive signal from drive circuitry 152. Electrodes 138 and 140 couple to measurement circuitry 154 through amplifiers 150 and 148, respectively. Measurement circuitry 154 provides an output related to flow in accordance with known techniques. Measurement circuitry 154 can include, for example, suitably programmed or configured microprocessor(s) or digital signal processor (DSP) circuitry.

Figure 3:
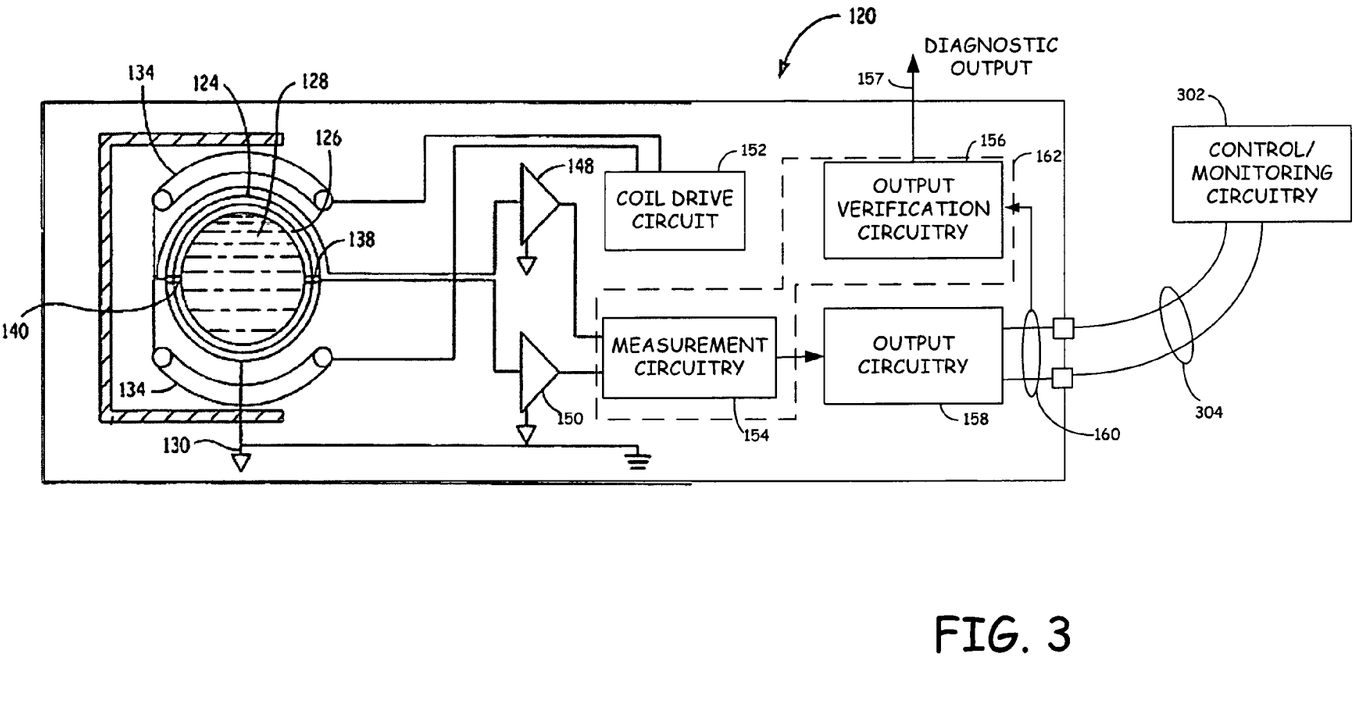
FIG. 3 is a diagrammatic view of a magnetic flowmeter in which embodiments are particularly useful.

The output of measurement circuitry 154 is provided to output circuitry 158 for transmission to control or monitoring circuitry remote from magnetic flowmeter 120. Output circuitry 158 includes, in various embodiments, one or both of analog output circuitry and pulse output circuitry. The output (s) of output circuitry 158 are shown generally at 160. As illustrated for example in FIG. 3, output 160 can be a two terminal output coupled to a 4-20 mA current loop 304 over which the analog and/or pulse outputs are transmitted to control or monitoring circuitry 302 generally located remotely from flowmeter 120.

Output verification circuitry 156 receives output 160 and performs diagnostic analysis on the analog and/or pulse output to verify that output circuitry 158 is working properly. Based on the results of the diagnostic analysis, output verification circuitry 156 generates diagnostic output 157 which is indicative of whether the analog or pulse outputs are functioning properly. In some embodiments, output verification circuitry 156 is embodied in the same DSP as measurement circuitry 154, though this need not be the case. To illustrate the optional implementation of the measurement circuitry and output verification circuitry in the same DSP, dashed lines 162 are used to represent a DSP. Other functions of transmitter 120 can also be implemented in DSP circuitry 162, even if not shown inside the illustrated dashed lines.

Figure 4:
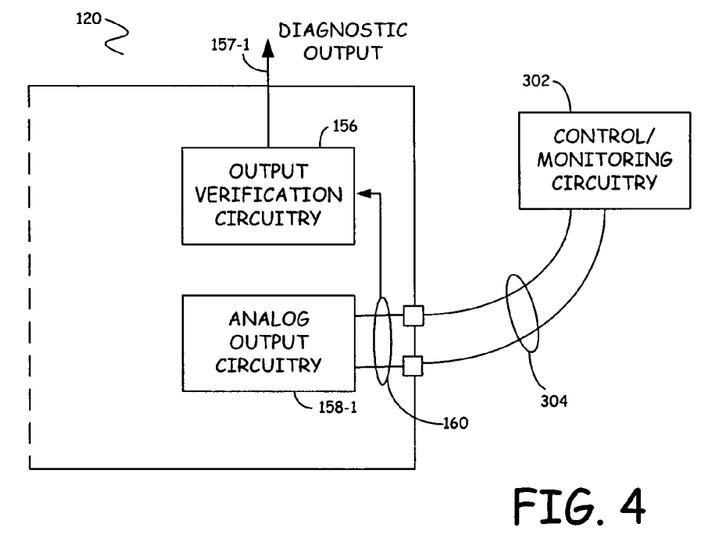
FIG. 4 is a diagrammatic view of a portion of a magnetic flowmeter illustrating analog output circuitry and output verification circuitry in one embodiment.

FIG. 4 is a diagrammatic illustration of a portion of magnetic flowmeter 120 in one more particular embodiment. In this embodiment, output circuitry 158 includes analog output circuitry 158-1 which is used to control the current on current loop 304 in order to communicate flow related information to control/monitoring circuitry 302. In this embodiment, output verification circuitry 156 is coupled to analog output 160 to verify that the analog output circuitry 158-1 is functioning properly. Using various verification techniques, output verification circuitry provides diagnostic output 157-1.

Figure 5:
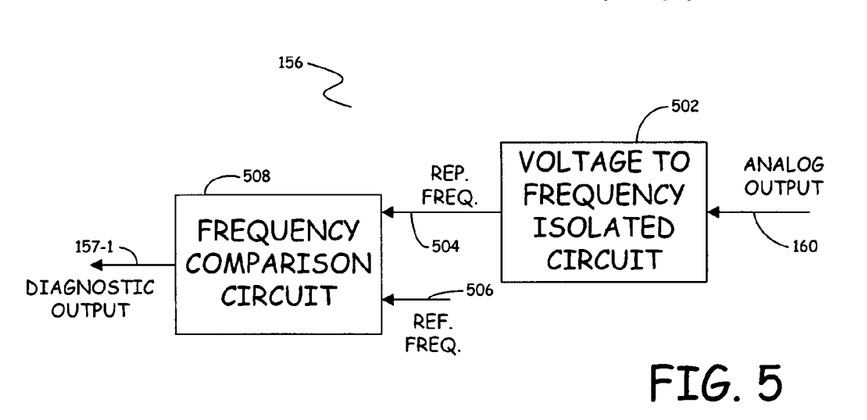
FIG. 5 is a diagrammatic view of portions of an embodiment of the output verification circuitry shown in FIG. 4.

FIG. 5 is a diagrammatic illustration of aspects of one embodiment of output verification circuitry 156 for use in providing diagnostic output 157-1. In this embodiment, output verification circuitry 156 includes a voltage to frequency isolated circuit 502 which receives the analog output 160 as an input. Voltage to frequency circuit 502 converts the sensed voltage into a representative frequency 504. Representative frequency 504 is then fed into a frequency input of a frequency comparison circuit 508, where it is compared to a reference frequency 506. Reference frequency 506 is indicative of what the representative frequency is expected to be for the intended analog output. Based on the comparison, frequency comparison circuit 508 provides a diagnostic output 157-1 indicative of whether analog output circuitry 158-1 is functioning properly.

Figure 6:
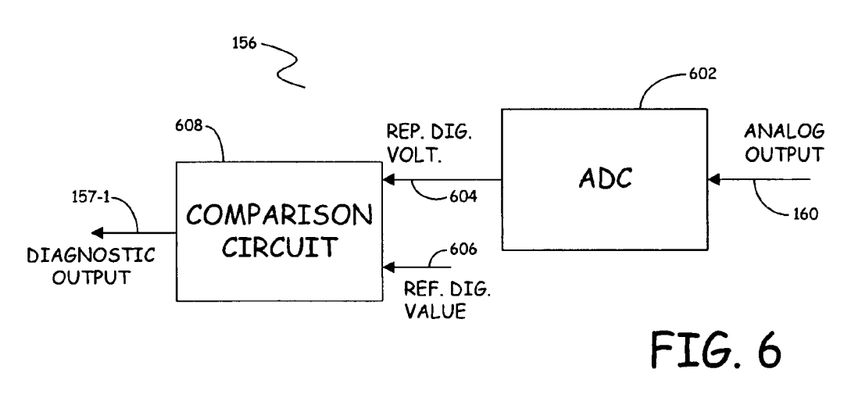
FIG. 6 is a diagrammatic view of portions of another embodiment of the output verification circuitry shown in FIG. 4.

FIG. 6 is a diagrammatic illustration of aspects of another embodiment of output verification circuitry 156 for use in providing diagnostic output 157-1. In this embodiment, output verification circuitry 156 includes a analog-to-digital (ADC) converter 602 which receives the analog output 160 as an input. Analog-to-digital converter 602 converts the sensed voltage from the analog signal into a representative digitized voltage value 604. Digitized voltage value 604 is then fed into a comparison circuit 608 where it is compared to a reference digital value 606. Reference digital value 606 is indicative of what the representative digitized voltage value 604 is expected to be for the intended analog output. Based on the comparison, circuit 608 provides diagnostic output 157-1 indicative of whether analog output circuitry 158-1 is functioning properly.

Figure 7:
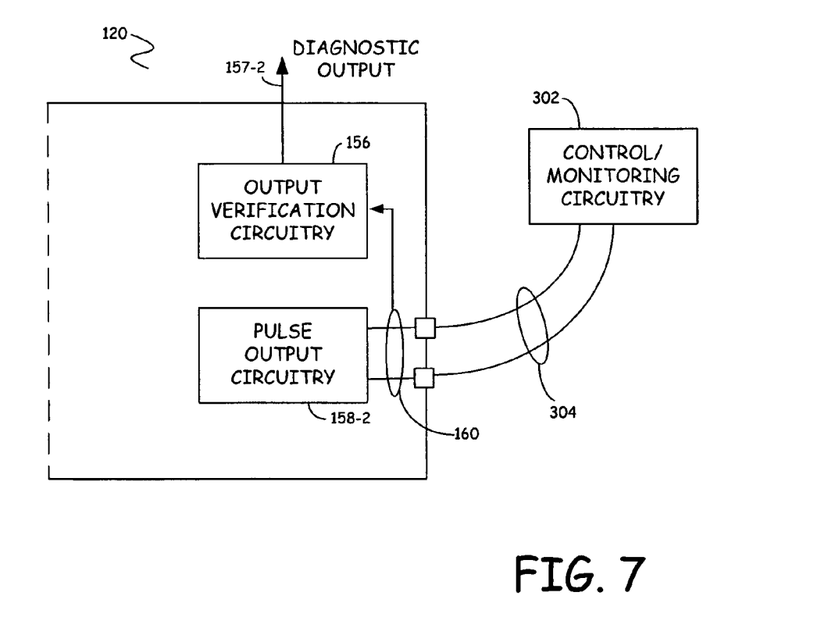
FIG. 7 is a diagrammatic view of a portion of a magnetic flowmeter illustrating pulse output circuitry and output verification circuitry in one embodiment.

FIG. 7 is a diagrammatic illustration of a portion of magnetic flowmeter 120 in another more particular embodiment. In this embodiment, output circuitry 158 includes analog output circuitry 158-2 which is used to generate a pulse output for communication over a transmission line, for example over current loop 304, in order to communicate flow related information to control/monitoring circuitry 302. Typically, in such embodiments, control/monitoring circuitry 302 includes a pulse counter for counting the transmitted pulses in order to ascertain the flow information. In this embodiment, output verification circuitry 156 is coupled to pulse output 160 to verify that the pulse output circuitry 158-2 is functioning properly. Using various verification techniques, output verification circuitry provides diagnostic output 157-2.

Figure 8:
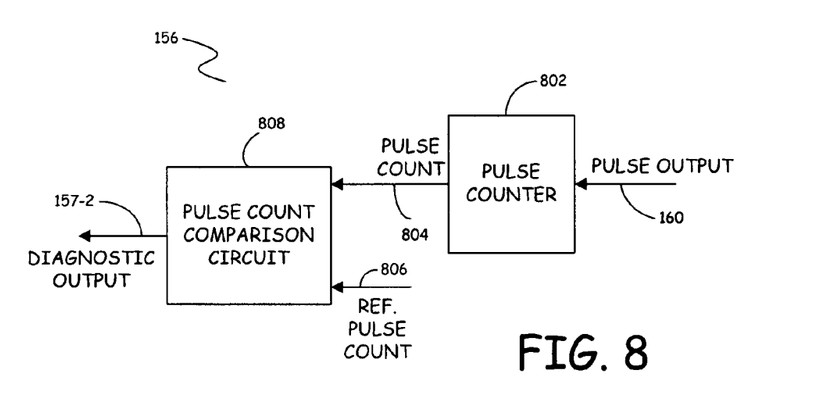
FIG. 8 is a diagrammatic view of portions of an embodiment of the output verification circuitry shown in FIG. 7.

FIG. 8 is a diagrammatic illustration showing some features of output verification circuitry 156 in an example pulse output embodiment. By sampling the pulse output and feeding this information back to the DSP or other sensing or processing circuitry, it can be confirmed that the pulse output is functioning correctly to provide a verification of the transmitter performance. The pulse output can be verified by connecting the pulse output terminals to a digital input and counting pulses over a defined interval of time. The verification can also be accomplished by directly monitoring the pulse output and feeding it back into the DSP or microprocessor circuitry to provide a continuous verification of the output.

In the illustrated embodiment of FIG. 8, output verification circuitry 156 includes a pulse counter 802 which receives the pulse output, or a pulse signal generated as a function of the pulse output, and generates a pulse count 804. Pulse count 804 can be a count over a particular predetermined period of time, a total count since some initializing time, or other types of pulse counts. In this example, output verification circuitry 156 also includes a pulse count comparison circuit 808 which compares the pulse count 804 to a reference pulse count 806 chosen to represent an expected pulse count if output circuitry 158-2 is functioning properly. Based on the comparison, comparison circuit 808 generates a diagnostic output 157-2. For example, if the pulse count is different than the reference pulse count by more than some predetermined margin, diagnostic output 157-2 can be indicative of the improper functioning of the pulse output circuitry 158-2. On the other hand, if the pulse count is within the predetermined margin of the reference pulse count, then diagnostic output 157-2 can be indicative of the proper functioning of the pulse output circuitry.

FIG. 9 is a diagrammatic illustration showing features of output verification circuitry 156 in another example pulse output embodiment. As illustrated in FIG. 9, but as applicable to other illustrated embodiments as well, the pulse output can be connected to a digital input of the verification circuitry via a coupling device 850 such as an optocoupler or a transformer. This allows the pulse output to be analyzed without affecting the pulse output itself.

Another optional feature of output verification circuitry 156 is frequency divide-down circuit 852 which can be used to divide down (i.e., lower) the frequency of the analyzed pulse output to reduce requirements on the other sensing circuitry. The resulting frequency divided pulse output 854 can then be analyzed by the other sensing circuitry. However, the frequency divide-down function need not be implemented in all embodiments.

A sampling circuit 856 can be included to sample the pulse output (or the frequency divided pulse output) to produce a sampled frequency signal 858. A frequency to voltage converter 860 then generates a voltage 862 which is representative of the sampled frequency. Analog-to-digital converter 864 receives the representative voltage as an input and generates as an output a digitized value 866 corresponding to the voltage 862 and thereby representative of the sampled frequency. Comparison circuit 868 compares the digitized voltage value 866 with a reference digital value 870 chosen to represent an expected pulse count frequency if output circuitry 158-2 is functioning properly. Based on the comparison, comparison circuit 868 generates a diagnostic output 157-2 to indicate malfunctions or proper performance.

Figure 10:
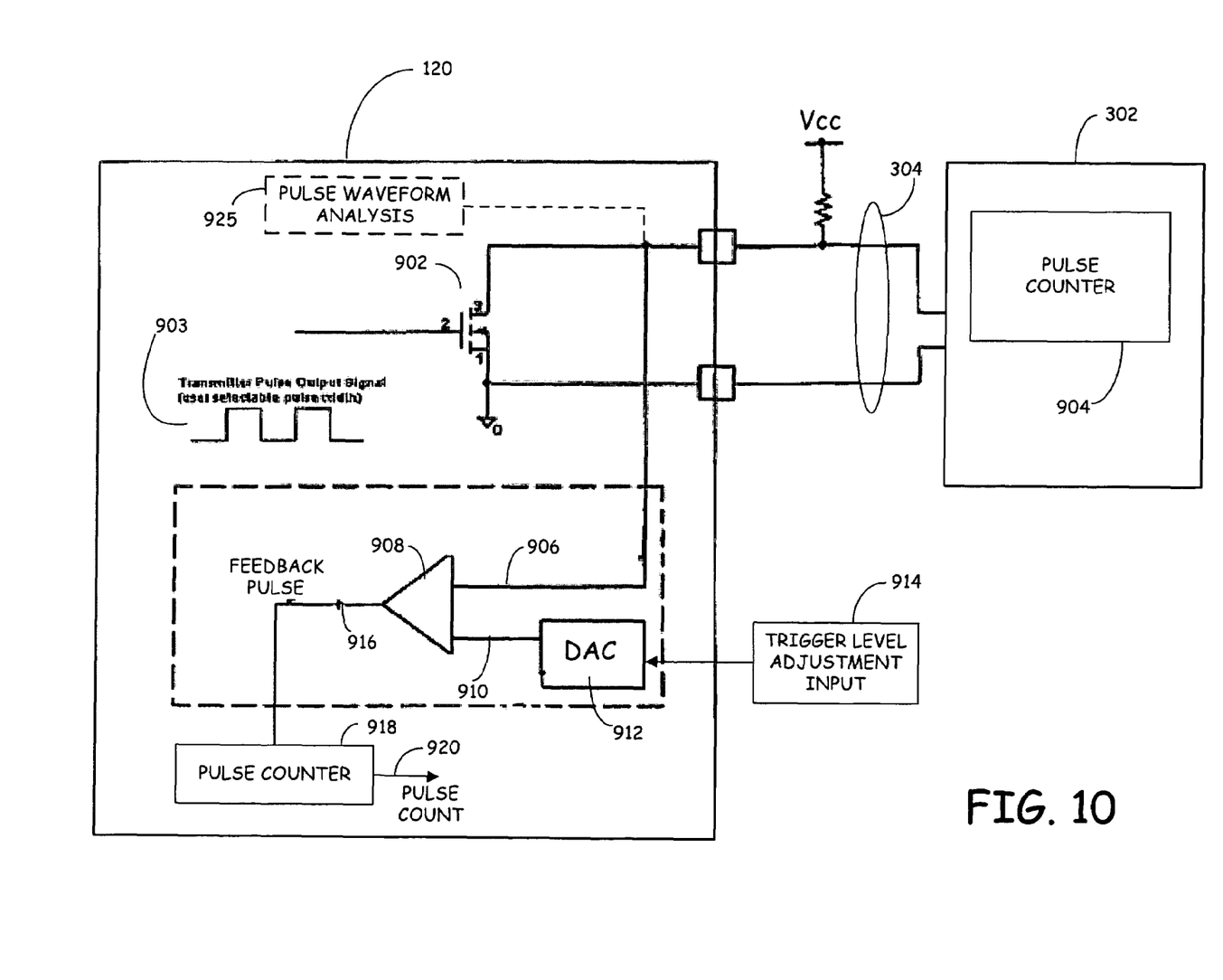
FIG. 10 is a diagrammatic view of portions of a magnetic flowmeter illustrating tunable pulse trigger features of some embodiments.

FIG. 10 is a diagrammatic illustration of portions of magnetic flowmeter transmitter 120 in yet another embodiment which can be practiced together or independently of other disclosed embodiments. Customers who utilize flowmeter transmitters typically have programmable logic controllers (PLCs) systems which implement a pulse counter 904 to count pulses in the pulse output of transmitter 120. The customer PLC systems have a trigger level at which the pulse output from the transmitter is evaluated. The trigger level will vary by customer set-up. In the embodiment illustrated in FIG. 10, the transmitter 120 verifies the pulse output signal at the same trigger level used by the customer by providing adjustable trigger levels in the pulse feedback circuit. Thus, when implemented in the transmitter, the customer can set a trip point for the pulse output detection circuit.

Figure 11:
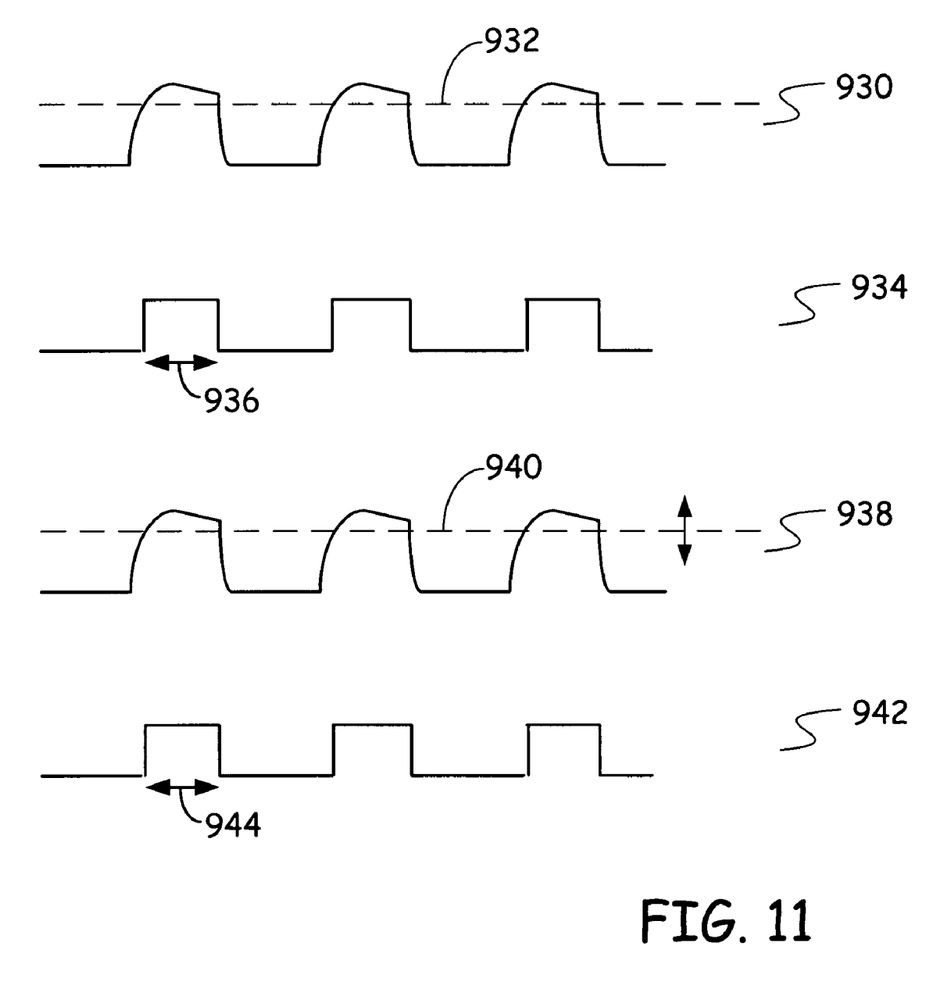
FIG. 11 is a diagram illustrating pulse waveforms described with reference to FIG. 10.

As represented in FIG. 10, in some embodiments of magnetic flowmeter transmitter 120 a transistor 902 is used as part of output circuitry 158 to generate the pulse output signal, represented in FIG. 10 at reference number 903. By way of example, FIG. 11 illustrates at waveform 930 what the pulse output signal might look like for a particular set of parasitic capacitance effects on the loop wiring (e.g. process loop 304, other electrical wiring, etc.). As noted above, the customer's pulse counter 904 typically has an adjustable trigger level 932 at which the pulses are to be identified. The result is a pulse width 936 seen by the counter 904 as shown in waveform 934. The pulse width 936 typically would change if the trigger level 932 were adjusted.

To provide the ability to set the output verification circuitry trigger level such that it matches that used by the customer's pulse counter 904, a tunable trigger level mechanism is utilized. In FIG. 10, the pulse output is provided to input 906 of a comparator 908. As an example, the pulse signal provided at input 906 might look similar to waveform 938 shown in FIG. 11. The feedback pulse output 916 in FIG. 10 provided by comparator 908 is represented by waveform 942 in FIG. 11. Using a trigger level adjustment input 914 to provide a digital signal input 910 to DAC 912, an adjustable trigger level 940 for comparator 908 can be implemented. Thus, trigger level 940 can be controlled to be the same as trigger level 932 to insure that the pulse width 944 detected by comparator 908 matches pulse width 936 if the pulse output circuitry is properly functioning. The feedback pulse 916 can then be counted by a pulse counter 918 in transmitter 120 to generate a pulse count 920. Pulse count 920 is then used for providing diagnostic outputs 157-2 as described above, for example.

In some embodiments, trigger level adjustment input automatically adjusts to different trigger levels in order to evaluate parasitic capacitances on the electrical wiring over which pulse output is transmitted (for example loop 304) or to determine if the wiring is in a desired condition. As such, in this or other embodiments, trigger level adjustment input 914 need not be externally located on the transmitter, but can instead be internally controlled by processing circuitry within the transmitter.

Another optional feature included in some magnetic flowmeter transmitter embodiments is pulse waveform analysis circuitry 925. In embodiments including pulse waveform analysis circuitry, the pulse signal is fed back to circuitry 925 for waveform analysis. Circuitry 925 digitizes the pulse signal and then analyzes the waveform for properties or characteristics such as rise time, duty cycle and amplitude.

Although the present invention has been described with reference to example embodiments, workers skilled in the art will recognize that changes may be made in form and detail without departing from the spirit and scope of the invention. For example, the analog and pulse output circuitries can, and often are, implemented in the same transmitter even though they are demonstrated separately here in some embodiments for the sake of clarity. Likewise, various features of different embodiments can be combined for particular implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A magnetic flowmeter transmitter comprising:
a flowtube;
measurement circuitry providing an output related to flow through the flowtube;
output circuitry coupled to the measurement circuitry and providing a transmitter output that is related to flow through the flowtube to a remote location; and
output verification circuitry coupled to the output circuitry and verifying proper operation of the output circuitry;
wherein the output circuitry includes pulse output circuitry providing a pulse output on electrical wiring in order to transmit flow information; and
wherein the output verification circuitry verifies a pulse output frequency in order to verify proper operation of the pulse output circuitry.
2. The magnetic flowmeter transmitter of claim 1, wherein the output circuitry includes analog output circuitry that provides an analog output by controlling an analog current loop in order to transmit flow information over the analog current loop.
3. The magnetic flowmeter transmitter of claim 2, wherein the output verification circuitry measures a parameter associated with the analog output and compares the measured parameter to known values for verification.
4. The magnetic flowmeter transmitter of claim 2, wherein the output verification circuitry converts the analog output to an isolated frequency and verifies proper operation of the analog output circuitry using the isolated frequency.
5. The magnetic flowmeter transmitter of claim 1, wherein the output verification circuitry includes pulse counting circuitry that counts pulses from the pulse output and that verifies the pulse output frequency as a function of the counted pulses from the pulse output.
6. The magnetic flowmeter transmitter of claim 5, wherein the output verification circuitry includes pulse count comparison circuitry that compares the counted pulses from the pulse output to a reference pulse count and that verifies proper operation of the pulse output circuitry based upon the comparison.
7. The magnetic flowmeter transmitter of claim 1, wherein the output verification circuitry comprises:
sampling circuitry that provides a sampled frequency signal; frequency to voltage conversion circuitry that converts a frequency of the sampled frequency signal into a representative voltage;

an analog to digital converter that converts the representative voltage into a representative digital voltage value; and wherein the pulse output verification circuitry verifies the pulse output frequency as a function of the digital voltage value.

8. The magnetic flowmeter of claim 1, wherein the output verification circuitry further comprises adjustable pulse feedback trigger level circuitry that adjusts a trigger level above which a pulse in the pulse output will be detected.

9. The magnetic flowmeter of claim 8, wherein the adjustable pulse feedback trigger level circuitry adjusts the trigger level as a function of a trigger level adjustment input.

10. The magnetic flowmeter of claim 8, wherein the adjustable pulse feedback circuitry automatically adjusts to different trigger levels in order to evaluate parasitic capacitances on the electrical wiring or to determine if the electrical wiring is in a desired condition.

11. The magnetic flowmeter transmitter of claim 1, and further comprising pulse waveform analysis circuitry that digitizes the pulse output and that analyzes a pulse output waveform for at least one of rise time, duty cycle and amplitude.

12. A magnetic flowmeter transmitter for monitoring flow through a flowtube, the magnetic flowmeter transmitter comprising:

measurement circuitry that senses flow through the flowtube and that provides an output related to flow through the flowtube;

output circuitry coupled to the measurement circuitry providing a transmitter output that is related to flow through the flowtube to a remote location; and output verification circuitry coupled to the output circuitry that verifies proper operation of the output circuitry, wherein the transmitter is coupled to an analog current loop and wherein the output circuitry provides an analog output on the analog current loop in order to transmit flow information over the analog current loop; and wherein the output verification circuitry is internal to the transmitter and measures a parameter associated with the analog output and compares the measured parameter to known values for verification.

13. The magnetic flowmeter transmitter of claim 12, wherein the output verification circuitry converts the analog output to an isolated frequency and verifies proper operation of the output circuitry using the isolated frequency.

14. The magnetic flowmeter transmitter of claim 12, wherein the transmitter is coupled to communication wiring and wherein the output circuitry provides a pulse output on the communication wiring in order to transmit flow information.

15. The magnetic flowmeter transmitter of claim 14, wherein the communication wiring is the analog current loop.

16. The magnetic flowmeter transmitter of claim 14, wherein the output verification circuitry verifies a pulse output frequency in order to verify proper operation of the output circuitry.

17. The magnetic flowmeter of claim 14, wherein the output verification circuitry further comprises adjustable pulse feedback trigger level circuitry that adjusts a trigger level above which a pulse in the pulse output will be detected by the output verification circuitry.

* * * * *